(No Model.)  2 Sheets—Sheet 1.
P. B. MATHIASON.
BRICK MACHINE.
No. 369,118.  Patented Aug. 30, 1887.
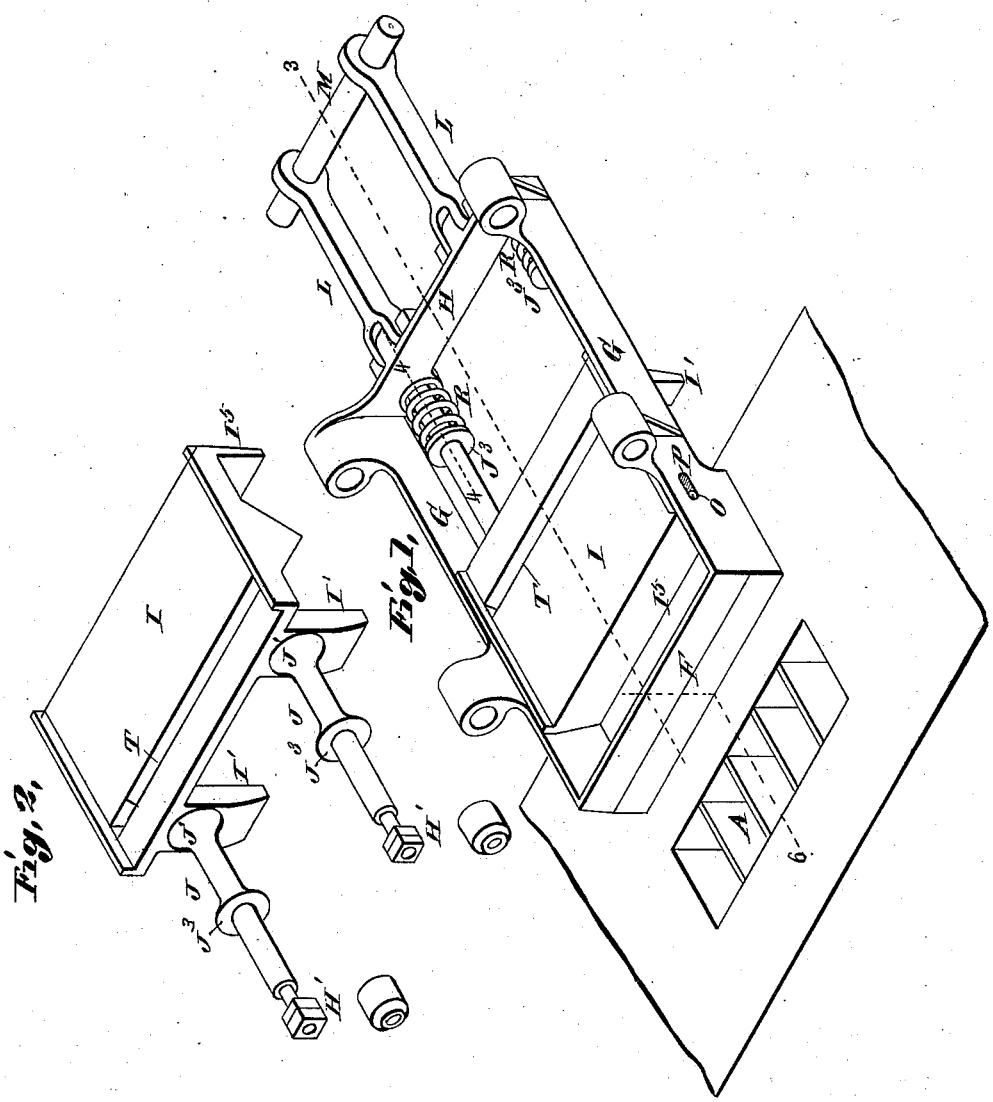
Attest:
F. A. Hopkins
H. S. Knight
Inventor:
Peter B. Mathiason
By Knight Bros
attys

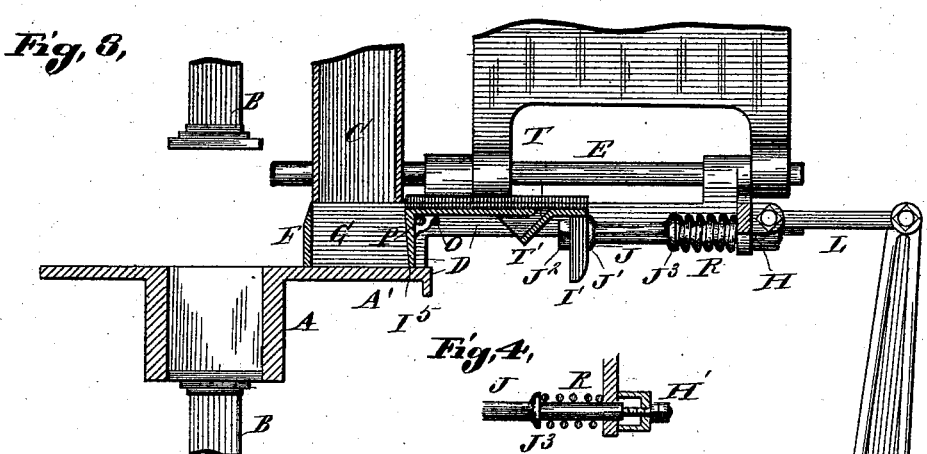
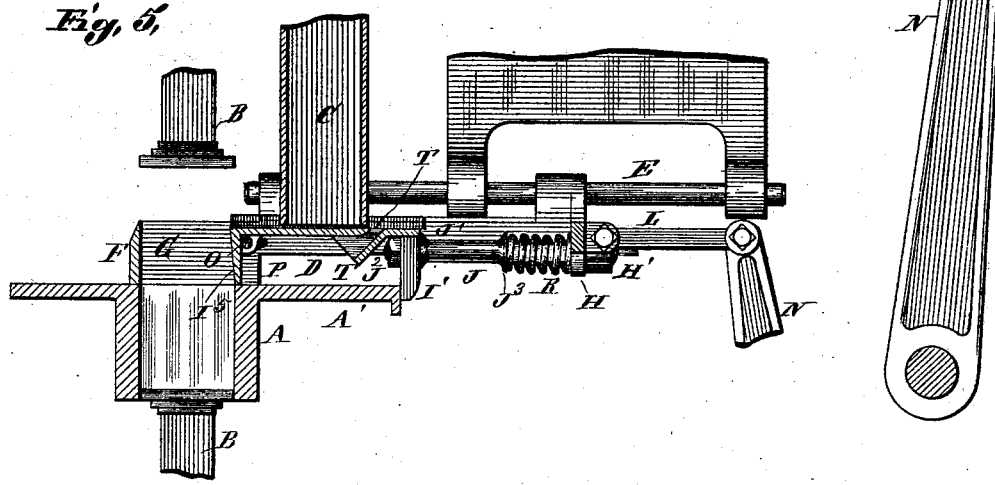
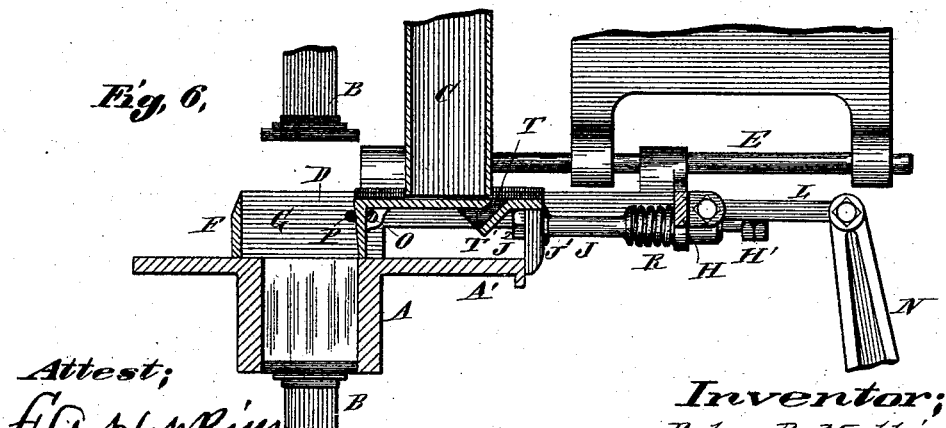

UNITED STATES PATENT OFFICE.

PETER B. MATHIASON, OF ST. LOUIS, MISSOURI.

BRICK-MACHINE.

SPECIFICATION forming part of Letters Patent No. 369,118, dated August 30, 1887.

Application filed October 19, 1886. Serial No. 216,677. (No model.)

*To all whom it may concern:*

Be it known that I, PETER B. MATHIASON, of the city of St. Louis, in the State of Missouri, have invented a certain new and useful Improvement in Brick-Machines, of which the following is a full, clear, and exact description, reference being had to the accompanying drawings, forming part of this specification, and in which—

Figure 1 is a perspective view illustrating my improvement. Fig. 2 is a detail perspective view. Figs. 3 and 6 are longitudinal sections taken on line 3 6, Fig. 1, Fig. 3 showing the charger in its rear and contracted position and Fig. 6 showing the charger in its forward and expanded position. Fig. 4 is a detail view taken on line 4 4, Fig. 1. Fig. 5 is a similar section to Figs. 3 and 6, showing the charger in its forward position, as in Fig. 6, nut not expanded.

My invention relates to the charger of a brick-machine, and has for its object a brick-machine charger which, when moved forward over the molds, will expand to release the clay and allow it to drop freely into the molds; and my invention consists in features of novelty hereinafter fully described, and pointed out in the claims.

Referring to the drawings, A represents the mold, B the plungers, and C the feed chute or hopper, of the brick-machine, no invention being here claimed in these parts.

D represents the charger, which I have shown supported and sliding on rods E, as in my patent, No. 331,420, issued December 1, 1885; but it may be suspended in any other suitable manner. It consists of a front piece, F, having rearwardly-extending sides G, and a back, H, within which fits a block or member, I, to the rear end of which are secured rods J, that pass through the back H, with nuts H' on their rear ends. The back H is connected by links, arms, or other suitable means, L, and a rod, M, to an operating crank or lever, N. As the lever N is moved back and forth the charger is moved to and from the mold, it being brought into the position shown in Fig. 3 to receive the clay, and then being moved into the position shown in Figs. 5 and 6 to drop the clay into the molds.

The member I of the charger is connected to the side G by pins O, fitting in slots P of the sides; or, of course, they could be formed upon the sides and fit in slots made in the member I. The rear part of the member I is provided with a downwardly-extending projection, I', to which the front ends of the rods J are connected, the rods having flanges J' on one side of the projection I' and nuts J² on the other side of the projection. The projection I' acts as a stop to limit the forward movement of the member I of the charger by coming against the mold-top A', as shown in Figs. 5 and 6.

R represents springs placed between flanges J³ on the rods and the back piece, H, of the charger. The office of these springs is to force and hold the member I in its forward position relative to the other part of the charger, with the pins O bearing against the forward ends of the slot P until the charger is moved forward sufficiently far for the projection I' to come against the mold-top A', and as the lever N has not yet completed its forward movement, these springs yield to the pressure of the lever, permitting the part F G H of the charger to move still farther forward from the position shown in Fig. 5 to the position shown in Fig. 6, thus enlarging the opening of the charger and releasing the clay and allowing it to drop freely into the mold.

As soon as the charger commences to move backward, the springs R force the member I of the charger toward the part F of the other member, causing the pins O to move from the rear end to the front end of the slots P, thus contracting the opening of the charger, and in this position it is brought beneath the hopper C, to be again refilled. It will thus be seen that each time the charger is moved over the mold it will be expanded to release the clay and allow it to drop freely into the mold, and each time it recedes it is contracted to its normal position.

As a small amount of clay is liable to be worked back and fall over the rear end of the part I of the charger, if no provision is made to prevent it, I form an opening, T, in this part of the charger, near the rear end, and arrange beneath the opening an inclined chute, T'. Thus, as the charger moves forward from the position shown in Fig. 3 to the position shown in Figs. 5 and 6, any dirt there is on the part I of the charger will be scraped back by the hopper C, and, falling through the opening T and down the chute T', will fall upon the part A' of the mold. Then as the charger recedes the vertical front I⁵ of the part I of the mold will force the clay off the part A' of the mold, where it will be received by any suitable receptacle.

I claim as my invention—

1. In a brick-machine, a charger constructed of two members or parts, in combination with a mold, the charger being constructed to expand or enlarge when it is brought over the mold, substantially as set forth.

2. In a brick-machine, in combination with the mold, a charger constructed to expand when brought over the mold, substantially as and for the purpose set forth.

3. In a brick-machine, in combination with a mold, an expansible and contractible charger expanded and contracted automatically by its forward and rearward movement, substantially as and for the purpose set forth.

4. In a brick-machine, in combination with a mold, a charger having an outer member consisting of front, side, and rear pieces, and an inner member movable independently of the outer member, and a part against which said inner member impinges for enlarging the opening in the charger, substantially as set forth.

5. In a brick-machine, in combination with a mold, a charger having an outer part consisting of front, side, and rear pieces, and an inner part secured to the outer part by slot-and-pin connection and by rods surrounded by springs, substantially as and for the purpose set forth.

6. In a brick-machine, in combination with a mold, a charger having an outer part and an inner part movably secured together by slot-and-pin connection, and mechanism for arresting the movement of the inner part before the outer part has completed its stroke, substantially as and for the purpose set forth.

7. In a brick-machine, in combination with a mold, a charger having an outer part consisting of front, side, and rear pieces, an inner part secured to the outer part by slot-and-pin connection and by rods surrounded by springs, and a projection, I', on the inner part, substantially as and for the purpose set forth.

8. In a brick-machine, in combination with the mold, a charger having an outer part consisting of a front piece, slotted side pieces, and a rear piece, an inner part having a projection, I', and pins entering the slots in the sides of the outer part, rods J, connecting the part I' of the inner part of the charger to the rear piece of the outer part of the charger, springs surrounding the rods, and mechanism connected to the rear piece of the outer part of the charger, for moving the charger back and forth, substantially as and for the purpose set forth.

9. In a brick-machine, in combination with a mold, a charger consisting of an outer and inner part, the inner part having an opening, T, chute T', and front piece, I⁵, substantially as and for the purpose set forth.

PETER B. MATHIASON.

In presence of—
GEO. H. KNIGHT,
JOS. WAHLE.